April 15, 1941.   H. G. BUSIGNIES ET AL   2,238,211
RADIO DIRECTION FINDER INSTALLATION
Filed May 11, 1939   3 Sheets-Sheet 2

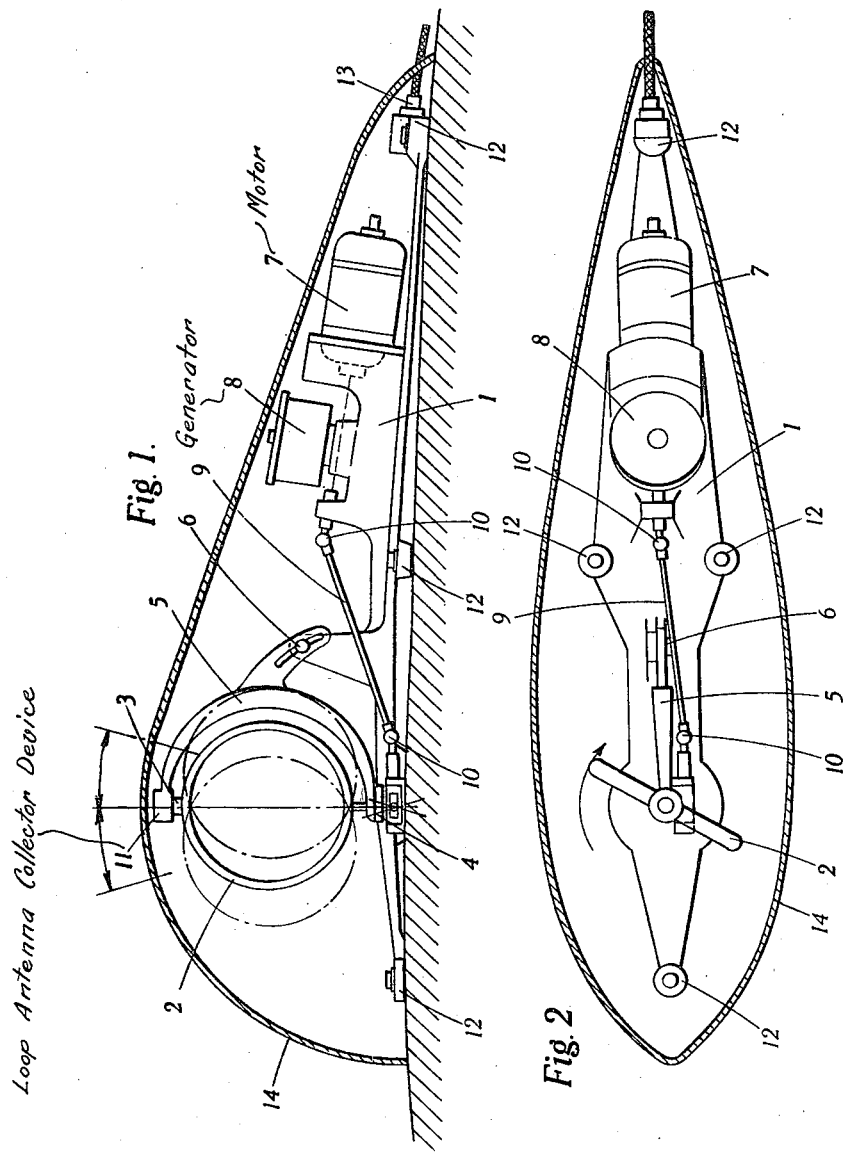

Inventor
H. G. Busignies
P. L. Bour
by *E. O. Kinney*
Attorney

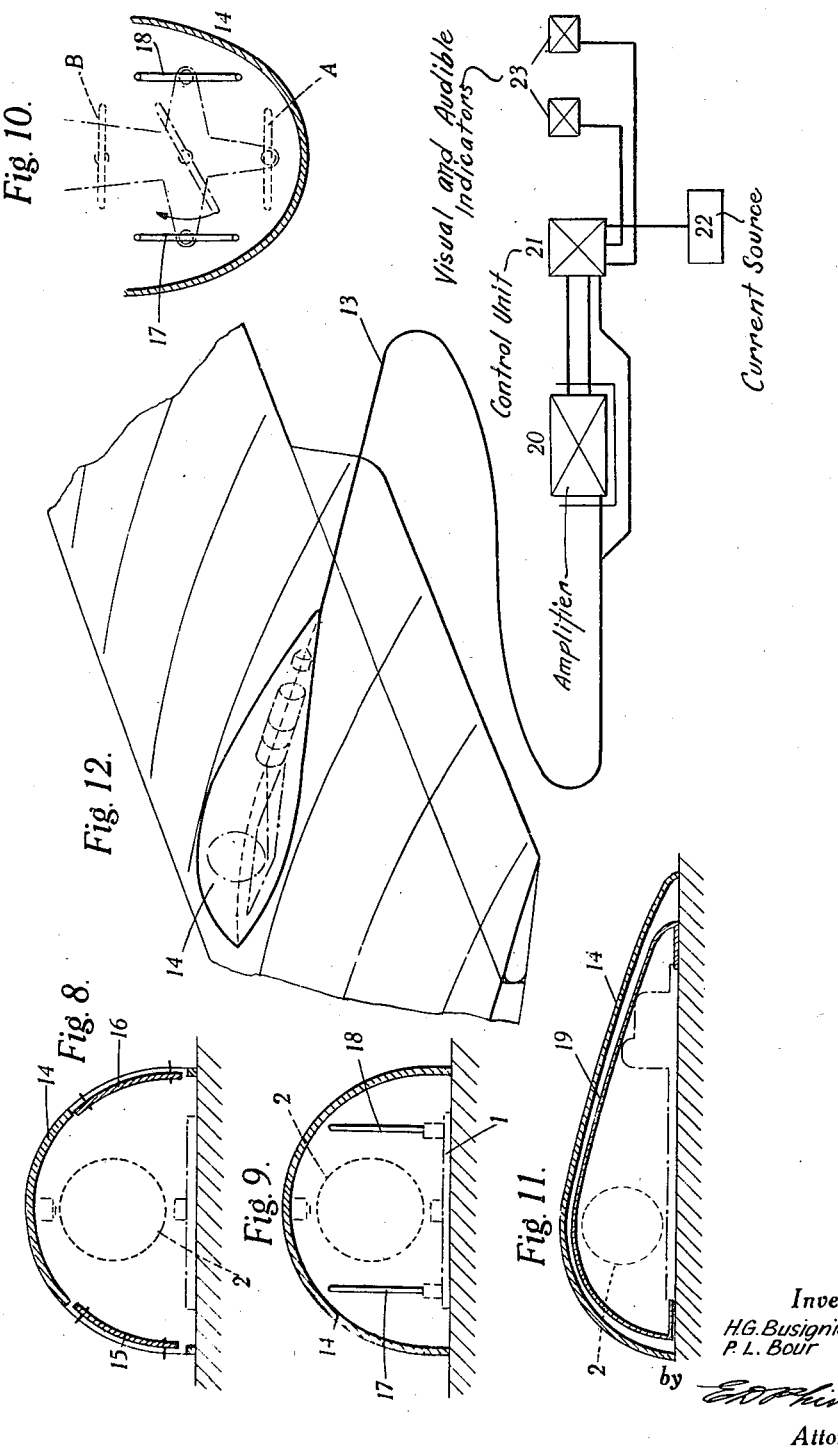

Patented Apr. 15, 1941

2,238,211

UNITED STATES PATENT OFFICE 2,238,211

RADIO DIRECTION FINDER INSTALLATION

Henri Gaston Busignies and Paul Lucien Bour, Paris, France, assignors to International Standard Electric Corporation, New York, N. Y.

Application May 11, 1939, Serial No. 272,998
In France May 28, 1938

5 Claims. (Cl. 250—11)

The present invention relates to radio direction finder and the like equipments including apparatus utilising radio-electric variations, such as radio-goniometric apparatus.

The main object of the invention is to provide a unitary arrangement including the different component parts of the equipments of this type, which will take up a small amount of space, will be easy to set in place, and which will not interfere with other equipments previously installed on board the vehicle.

It is also an object of the invention to provide a unitary direction-finder arrangement which will be of suitable weight, size and shape to be mounted in appropriate positions on vehicles as judged from the electrical point of view, and remote from the control devices of the components.

In accordance with one characteristic of the invention, an apparatus sensitive to the direction of propagation of electromagnetic waves comprises a unitary arrangement including the component devices of the said appartus, and a profiled cap or cover containing some or all the said components and input and output wires only passing from this unitary arrangement to the control and indication equipments.

In accordance with another characteristic of the invention, the various components are carried on a base member which has a lower surface with no other projections than the means for fixing the unit on a part of the vehicle, or even without any projection, this base member only having accommodation for said fixing means.

In accordance with another characteristic of the invention, the components of the unitary arrangement are arranged so as to reduce the total amount of space taken up, that is to say, are adapted to the internal volume of a profiled cap.

In accordance with another characteristic of the invention, the profile cap or lid, whether or not fixed on the said base plate, is of insulating material.

In accordance with another characteristic of the invention, such a direction-finder unit is adapted to be mounted on the outer surface of the vehicle, for instance, on the wing of an aeroplane.

In a practical embodiment of the invention, such a unitary arrangement for a radio-electric direction finder comprises a wave collector such as a rotating frame aerial, means for driving said frame aerial, fixed or adjustable connecting means and a device driven at the same speed as the wave collector in order to generate locally a polyphase reference current for the distant indicators, and an insulating envelope or cap, pierced or not with a plurality of apertures and which may or may not be mechanically connected to any of the component devices.

In another embodiment of the invention, the wave collector is mounted on an adjustable bearing which is adapted to be inclined so that the axis of rotation of said wave collector normally remains vertical, whatever the inclination of the surface of the vehicle on which the base member is mounted. The connections from the frame aerial are taken either by means of a set of brushes and rings, or by means of an inductive coupling, preferably located at the upper portion of the wave collector, and the wave collector and the reference device are driven from the motor by means of flexible connections or joints such as Cardan, Oldham or similar joints.

In another embodiment of the invention the means for compensating for "quadrantal error" and usually consisting of closed metallic circuits which are located laterally or axially to the unitary arrangement, are inserted in or carried by the said cap or cover. These correction circuits may, moreover, be closed by the common base.

A unitary arrangement for a direction-finder in accordance with the invention comprises a socket or common support for the different components and which has no downward projections and may consequently be mounted in any position on the outer surface of the vehicle. The protector cover or cap can be easily removed to give access to the different components of the arrangement and is such that it protects the rotating collector from the influence of exterior forces without adversely effecting or interfering with the electrical operation thereof which permits of a decrease in weight and general physical strength in the wave collector, and of the associated elements in consequence of the decrease in strain exercised on these elements. Moreover, the cap or cover is profiled so as to offer a minimum of resistance to the air, and in consequence not to influence substantially the general resistance to the air of the vehicle.

The invention will be described in detail in connection with the attached drawings, in which:

Figs. 1 and 2 represent in section and in plan respectively a unitary radio-goniometer arrangement in accordance with characteristics of the invention;

Fig. 8 is a section through Fig. 7 along the line A—B;

Figs. 9 and 10 show in section and in plan metallic circuits for compensating for the quadrantal error and arranged inside of but independent of the cap structure;

Fig. 11 shows another form of circuits for compensation of the quadrantal error; and Fig. 12 indicates schematically the electrical circuit associated with a unitary arrangement in accordance with the invention.

Figure 3:
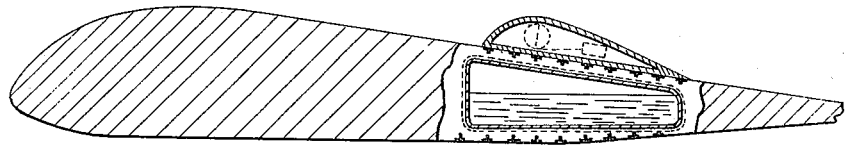
Figs. 3 to 6 show various ways of installing in aeroplanes a unitary arrangement in accordance with the invention.

Fig. 1 shows schematically by way of example a radio-electric direction-finder arrangement in accordance with the invention. The direction finder is of the type wherein the waves collected by a continuously rotatable loop are compared with a locally generated polyphase current to indicate direction in a manner shown in British Patent 452,102, accepted August 17, 1936. A single socket or base member 1 supports at one of its ends a rotating frame wave collector 2 mounted between two bearings 3 and 4 carried by a support of suitable shape and material 5. This support can be inclined forwardly or backwardly through a certain angular value as shown in dotted lines in two positions so that the axis of the frame aerial 2, which is coincident with the axis of the support 5, can be held by a locking device 6 in a vertical position, whatever the normal inclination of the surface of the machine on which the arrangement of Fig. 1 is mounted. Such an adjustment is carried out at the time of mounting and thus permits under normal conditions the satisfactory reception of the electro-magnetic waves by the frame collector 2. The base or socket 1 has at its rear end, and preferably as far as possible from the frame aerial, a screened electric motor 7 and an electrical device 8 for the production of polyphase currents for use in connection with the indicators on board the vehicle. The device 8 should rotate at the same speed as the frame aerial 2 and in the embodiment shown these two members are connected to each other by a shaft 9 terminated by swivel or Cardan joints 10. Such a driving arrangement is well known per se and it is clear that other mechanical coupling arrangements comprising gears may be employed, for instance a worm gear for each device 2 and 8, and connected to each other by flexible controls, for example, a flexible transmission cable.

The collector device 11 for the high frequency current induced in the frame aerial 2 is shown preferably placed in the upper portion of the support 5 so as to facilitate access to and maintenance of this element. The collector device 11 may be composed of contact rings and brushes of the type used in an electric motor collector, or better the properties of mutual inductance may be employed between the self-inductance of the rotating frame aerial, and a second self-inductance mounted on the support 5, and a high frequency magnetic core may or may not be associated with these self-inductances.

On the socket 1 and at the two ends thereof, for example, are fixed feet 12 and a cable exit 13, adapted to combine in the same protecting sheath the various conductors for electrical connection is provided on the rear end of the socket 1.

An insulating cap or cover 14 is shown, which encloses the unitary arrangement described. This cap, shown independent of the socket 1, is mounted on the parts of the vehicle which support said unitary arrangement. This insulating cap may be perforated with small apertures and is profiled so as only to offer a very slight resistance in accordance with the well known art in aeronautic construction. In this manner the rotating frame aerial 2 will collect radio-electric waves without being disturbed by the presence of said cap, but will, however, be protected against external influences due to the passage of the vehicle at high speeds through the surrounding air.

Figure 4:
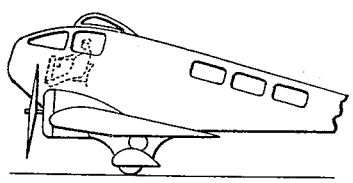
Figure 5:
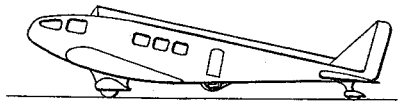
Figure 6:
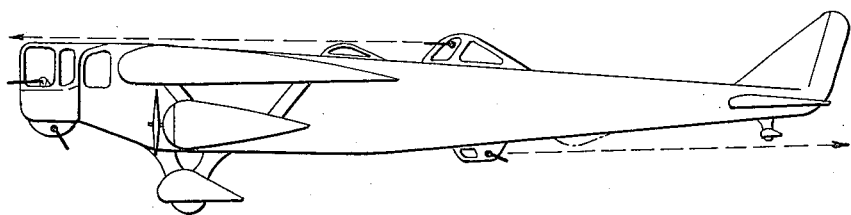

Such an arrangement having no lower projections can easily be arranged at all suitable points on the outer surface of a vehicle without interfering with the elements contained inside this surface, or without requiring a modification in said elements. For example, in the case of an aeroplane direction-finder such a unit may be arranged as shown in thick black lines either on a wing as shown in Fig. 3, for example, above a petrol tank contained in the wing, or may be above the pilot's seat as shown in Fig. 4, or below the cockpit as shown in Fig. 5, or again on a front portion of the cockpit in front of the pilot's seat, and not interfering by its dimensions with the pilot's angle of fire, if it is a question of a military aeroplane as shown in Fig. 6.

Figure 7:
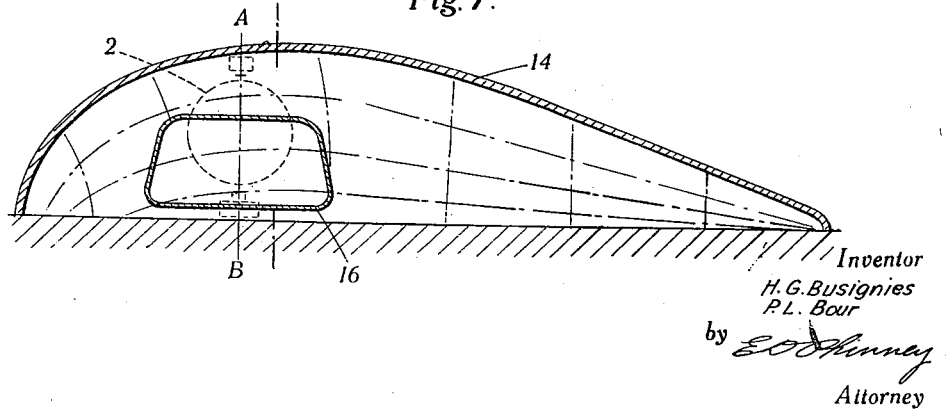
Fig. 7 shows schematically in section a unitary radio-compass arrangement provided with a metallic circuit for compensation of the quadrantal error forming a part of the cap structure.

Means for compensating quadrantal error in a unitary direction-finder arrangement of a vehicle having a certain arrangement of metallic masses around said finder may also be mounted on the socket 1 of the arrangement of Fig. 1. Such compensating means may consist of closed metallic circuits. Figs. 7 to 11 show various examples of the arrangement of such compensating circuits, incorporated in unitary arrangements of the present invention. For example, in an arrangement such as that of Figs. 1 and 2 closed metallic compensation circuits 15 and 16 may be inserted in the insulating cap 14 on each side of the rotating frame aerial 2 as indicated in Figs. 7 and 8.

These circuits may not form a portion of the cap 14, but instead be mounted on the socket 1 as indicated in Figs. 9 and 10 at 17—18. Such circuits may be adjustable and adapted to be oriented with respect to the socket 1 as indicated in plan in Fig. 10 in which two alternative positions A and B of the circuits 17 and 18 are indicated in dotted lines.

Whether these metallic compensation circuits are inserted in the insulating cap or carried by the socket 1, their exact positions will be experimentally determined when installing the direction-finding arrangement on the machine at the time of the "calibration" of said direction-finder.

In certain cases a metallic strip for axial compensation may be desirable. This strip being placed in the longitudinal direction may either form a portion of the insulating cap 14 or be fixed on the socket 1 inside said cap. Fig. 11 gives an example of such an arrangement in which the correction circuit 19 is fixed on the socket 1 at both ends. In the case in which this axial strip forms a part of the insulating cap 14 it can also serve to connect the cap 14 mechanically to the socket 1.

In the arrangement of Figs. 1 and 2 the cable outputs leading to the electrical control and indication apparatus in the pilot's seat of the machine are preferably provided at the back of the unitary arrangement with respect to the direction of movement of the vehicle, and perpendicular to the trailing edge so as not to increase the drag or favour eddy-currents on the portion of the vehicle where the unitary arrangement is mounted. Preferably, these conductors will be placed strictly against the surface of the vehicle up to a suitable position, where they enter the vehicle and the special protecting sheath may be provided.

Fig. 12 gives a general electrical arrangement of a direction-finder system on board an aeroplane. In this drawing is shown the wing of an aeroplane having the unitary arrangement schematically indicated in dotted lines inside the cap 14. From the back of the cap the cable 13 passes and comprises all the connecting conductors of the various components of the unitary arrangement to an amplifier 20, in a suitably protected position of the vehicle. This amplifier is itself connected to a control unit 21 placed in front of the pilot, and is fed by a suitable source 22, and connected to visual or audible indicators, or both, 23 placed in front of the pilot. These indicators may be of any suitable type, for example, magnetic, or may consist of synchronoscopic devices, cathode ray oscillographs or the like.

The fixing of the unitary arrangement may be ensured by very small bolts adapted to be set in place on thin partitions of the vehicle without reducing the strength of any porion of said vehicle.

It is clear that the arrangements which have been described by way of example in no way limit the invention, and that numerous modifications may be made therein without departing from the scope thereof. For example, the aero-dynamic cap 14 may only protect efficiently the rotating wave collector 2, and protect indirectly by its shape and position the units of driving and for the production of reference currents associated therewith. Moreover, it should be noted that the various components of the unitary arrangement are preferably adapted to have a unit form substantially similar to that of the profiled cap so that the internal space of said cap may be employed to the best advantage and consequently to permit a reduction of the volume of the unit. When the cap only covers some of said components such an arrangement should particularly be employed.

What is claimed is:

1. A radio direction finder for use on an aircraft comprising a rotatable wave collector, a motor for driving said collector, a device for generating polyphase reference currents and drive means for mechanically connecting said motor to said collector and said device for driving them, said collector, motor and device being arranged as a group outside the normal surface of said craft with said collector mounted at the forward end, an insulating cap of streamline contour enclosing said group, and a cable extending from said group and emerging from said cap for connecting said elements to remotely located auxiliary apparatus.

2. A radio direction finder according to claim 1, further comprising an adjustable support, a bearing for said rotatable wave collector mounted in said support, and means for adjusting said support to bring said wave collector into vertical position.

3. A radio direction finder according to claim 1, further comprising means in insulating cap for compensating for quadrantal error.

4. A radio direction finder according to claim 1, further comprising closed loop arrangements carried by said insulating cap for compensating for quadrantal error.

5. A radio direction finder according to claim 1, further comprising means carried by said insulating cap forming a partial loop circuit for compensating for quadrantal errors, and means mounted on said normal surface for completing said loop circuit upon placing said insulating cap into operative position.

HENRI GASTON BUSIGNIES.
PAUL LUCIEN BOUR.